(12) United States Patent
Koide (10) Patent No.: US 6,507,002 B1
(45) Date of Patent: Jan. 14, 2003

(54) METHOD FOR PROCESSING DISCHARGE NOZZLE OF LIQUID JET RECORDING HEAD AND METHOD FOR MANUFACTURING THE SAME HEAD

(75) Inventor: Jun Koide, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/603,191

(22) Filed: Jun. 26, 2000

(30) Foreign Application Priority Data

Jun. 29, 1999 (JP) .......................................... 11-182955

(51) Int. Cl.$^7$ .............................................. B23K 26/38
(52) U.S. Cl. ................................................. 219/121.71
(58) Field of Search ...................... 219/121.7, 121.71; 347/47; 29/890.1; 216/27, 65

(56) References Cited

U.S. PATENT DOCUMENTS

| | | | |
|---|---|---|---|
| 5,189,437 A | * 2/1993 | Michaelis et al. | ..... 219/121.71 |
| 5,208,980 A | 5/1993 | Hayes | |
| 5,305,018 A | * 4/1994 | Schantz et al. | ........ 219/121.71 |
| 5,657,539 A | 8/1997 | Orikasa et al. | |
| 5,946,024 A | * 8/1999 | Nishiwaki | ..................... 347/47 |
| 6,239,914 B1 | * 5/2001 | Nishiwaki | .............. 219/121.71 |
| 6,261,742 B1 | * 7/2001 | Chen et al. | .................... 347/47 |
| 6,426,481 B1 | * 7/2002 | Koide et al. | ........... 219/121.71 |

FOREIGN PATENT DOCUMENTS

| | | |
|---|---|---|
| EP | 0 761 448 | 3/1997 |
| EP | 0 968 824 | 1/2000 |
| JP | 6-24874 | 4/1994 |
| JP | 8-132260 | 5/1996 |
| JP | 9-118017 | 5/1997 |
| JP | 2000-6424 | 1/2000 |

\* cited by examiner

Primary Examiner—Geoffrey S. Evans
(74) Attorney, Agent, or Firm—Fitzpatrick, Cella, Harper & Scinto

(57) ABSTRACT

A method for processing a discharge nozzle of a liquid jet recording head includes bringing a mask plate on which the shape of an ejection orifice to be formed is patterned into close contact with the liquid ejection side of an ejection orifice forming plate on which a plurality of ejection orifices of a liquid jet recording head are formed, and emitting parallel laser beams from the mask plate side, thereby processing and forming a discharge nozzle at the ejection orifice forming plate. Another method for manufacturing a liquid jet recording head includes bringing a mask plate into close contact with the liquid ejection side of an ejection orifice forming plate having a plurality of ejection orifices formed thereon after at least the ejection orifice forming plate and a member for holding the ejection orifice forming plate have been coupled with each other from among members constituting the entire liquid jet recording head, and simultaneously emitting a plurality of parallel laser beams in a direction inclined at a predetermined angle with respect to a vertical axis of the mask plate face, thereby processing and forming a discharge nozzle at the ejection orifice forming plate. In both methods, the closely contacted mask plate and the ejection orifice forming plate are reciprocally scanned by one reciprocation or more along an arrangement for forming the discharge nozzles with respect to a laser bean emission area.

11 Claims, 5 Drawing Sheets

METHOD FOR PROCESSING DISCHARGE NOZZLE OF LIQUID JET RECORDING HEAD AND METHOD FOR MANUFACTURING THE SAME HEAD

BACKGROUND OF THE INVENTION

1. Field of the Invention

The present invention relates to a discharge nozzle processing method of using ultraviolet lasers for sublimating and processing a discharge nozzle in a liquid jet recording head for ejecting liquid droplets such as recording liquid droplets, thereby depositing the liquid droplets. Further, the present invention relates to a method for manufacturing the liquid jet recording head.

2. Related Background Art

In a liquid jet printing apparatus (an ink jet printer) for jetting recording liquid droplets such as ink, thereby depositing the liquid droplets on a recording medium, print quality greatly depends on characteristics of a nozzle portion for discharging the recording liquid. The characteristics of the nozzle portion are substantially determined depending on variations in the nozzle diameter or shape of the nozzle. Two methods for forming a nozzle are employed. There has been proposed a method for forming the nozzle using an electric casting technique employing a metal plate or an electric discharge processing technique, and a method for sublimating and processing (abrasion) an organic polymer resin material by means of high energy lasers such as ultraviolet-ray lasers represented by excimer lasers. At present, the latter, a fine processing method employing ultraviolet-ray lasers, is generally employed.

In this ultraviolet-ray laser processing method, when processing is carried out at an energy density of lasers preferable for sublimating and processing an organic polymer resin material, there are provided so called taper-shaped processing characteristics in which a processing area gradually decreases from the laser incident side to the laser emission side. In addition, the shape of the nozzle required to improve the print quality of the liquid jet recording head is a divergent taper-shape on a recording liquid ejection side. Thus, the laser processing method is carried out by laser emission from a recording liquid supply side. That is, there has been adopted a process for bonding a plate for forming the discharge nozzle to a member for supplying a recording liquid, after processing and forming the discharge nozzle.

However, the length of the discharge nozzle is required to be about 10 microns to about 100 microns in view of print quality. Of course, the ejection orifice forming plate which forms this discharge nozzle has a thickness similar to the above. This ejection orifice forming plate is a very thin and easily deformed member. The plate must be laser-processed from the liquid supply side to the ejection orifice forming plate, and must be bonded to a member for supplying the recording liquid, after processing and forming the discharge nozzle. Thus, there has been a problem that the ejection orifice forming plate is stress-deformed after bonding, a plurality of discharge nozzles arranged in one direction cannot be formed, and the recording liquid is discharged randomly, thereby degrading the print quality.

In order to solve this problem, there have been proposed methods for processing the discharge nozzle after the liquid jet recording head has been assembled. One is a method proposed in National Publication of International Patent Application No. 6-510958 (Compaq Computer Corporation). In this method, light beams restricted by a mask pattern are obliquely made incident on the ejection orifice forming plate in two directions. By making light beams obliquely incident thereto, the ejection orifice forming plate is processed in the forward direction of the light beams. As a result, the discharge nozzle is formed in a wider taper shape with its wide processing width being inward from the outside.

The other is a method proposed in Japanese Patent Publication No. 6-24874 (Zarl Limited). In this method, light beams are emitted in the form that a mask plate having a nozzle pattern formed thereon is brought into close contact with the ejection orifice forming plate. Then, the light beams are subjected to swinging or pivoting motion so as to be obliquely incident to the closely contacted mask plate and the ejection orifice forming plate. Further, processing advances in the light beam incident direction, thereby forming a convergent taper-shaped nozzle at the liquid ejection side of the ejection orifice forming plate.

However, in the aforementioned method described in National Publication of International Patent Application No. 6-510958, although a convergent tapered shape is formed at the liquid ejection side of the ejection orifice forming plate with respect to the obliquely incident direction of light beams because of its light beam processing in two directions only, a divergent tapered shape is formed at the liquid ejection side in a direction vertical thereto. In this way, a cone-shaped taper symmetrical to the liquid ejection direction is not formed, and thus, a recording liquid ejection fluid resistance occurs with the liquid ejection side in the divergent taper shape. As a result, the period of liquid ejection is delayed, thus preventing fast printing. Further, in the case of a divergent nozzle shape, there occurs a problem that a mist is generated during liquid ejection.

Furthermore, since this is not a mask pattern projection image forming system, discharge nozzles must be processed individually one by one. Thus, in the case where a very large number of discharge nozzles must be formed, there has been a problem that the processing time increases, which is disadvantageous as to productivity. Moreover, there has been a problem that the nozzle processing size is varied sensitively to the light beam energy strength, which causes difficulty in stability in processing accuracy.

In addition, in the aforementioned method described in Japanese Patent Publication No. 6-24874, a mask plate and an ejection orifice forming plate are subjected to a motion for these plates to be inclined to light beams with an elapse of time. This makes it difficult to process a taper shape symmetrical to the liquid ejection direction axis depending on the processing start state and processing end state, namely, depending on the processing operation process based on an elapse of time. As a result, there has been a problem that it is difficult to eject the recording liquid stably in a constant and uniform direction for each of individual liquid jet recording heads.

In order to solve the aforementioned problems, a method has been proposed in Japanese Patent Application No. 10-182407 for bringing a mask plate whose ejection orifice shape is patterned into close contact with an exterior face of an ejection orifice forming plate at which a plurality of liquid jet recording head ejection orifices are formed in a one-dimensional arrangement or a plurality of arrangements are formed; and simultaneously emitting a plurality of parallel ultraviolet-ray beams with high energy in a direction obliquely inclined by a predetermined angle with respect to a vertical axis of the mask plate face and in a rotationally symmetrical direction, thereby sublimating processing, and forming a discharge nozzle at an ejection orifice forming plate.

The discharge nozzle formed by this method is shaped to be symmetrical to the liquid ejection direction axis; the partially or entirely convergent tapered shape can be formed at the liquid ejection side of the ejection orifice forming plate; and a number of discharge nozzles can be batch processed for a short time. However, further technical improvements are expected in that the emitted light beam strength distribution is made uniform and symmetrical in a full processing area, and a plurality of discharge nozzles to be processed is formed in a uniform shape.

SUMMARY OF THE INVENTION

It is one object of the present invention to provide a method for processing a discharge nozzle for processing and forming a partially or entirely taper-shaped discharge nozzle at a liquid ejection side by means of laser processing with laser beam emission from a liquid ejection side of an ejection orifice forming plate, the discharge nozzle processing method being capable of uniformly processing all the ejection orifice nozzle shapes and constantly and accurately jetting recording liquid droplets, and further, to provide a liquid jet recording head manufacturing method capable of improving print quality.

It is another object of the present invention to provide a method for processing a discharge nozzle of a liquid jet recording head for bringing a mask plate on which the shape of an ejection orifice to be formed is patterned into close contact with the liquid ejection side of an ejection orifice forming plate on which a plurality of ejection orifices of a liquid jet recording head are formed, and emitting parallel laser beams from the mask plate side, thereby processing and forming a discharge nozzle at said ejection orifice forming plate, wherein the closely contacted mask plate and the ejection orifice forming plate are reciprocally scanned by one reciprocation or more along an arrangement for forming discharge nozzles with respect to a laser beam emission area.

In a method for processing a discharge nozzle of a liquid jet recording head according to the present invention, it is preferable that emissions of parallel ultraviolet-ray laser beams with high energy are arranged so as to be incident simultaneously in plurality in a direction obliquely inclined by a predetermined angle with respect to the vertical axis of the mask plate. In addition, it is preferable that emissions of parallel ultraviolet-ray laser beams with high energy are arranged simultaneously in a direction equally divided with respect to the peripheral direction of the vertical axis of the mask plate.

In a method for processing a discharge nozzle of a liquid jet recording head according to the present invention, it is preferable that parallel ultraviolet-ray laser beams with high energy each are composed of four luminous fluxes, and are emitted simultaneously in a direction equally divided with respect to the peripheral direction of the vertical axis, the beams each being inclined at a predetermined angle with respect to the vertical axis of the mask plate.

It is a still another object of the present to provide a method for manufacturing a liquid jet recording head for bringing a mask plate on which the shape of an ejection orifice to be formed is patterned into close contact with the liquid ejection side of an ejection orifice forming plate having a plurality of ejection orifices formed thereon after at least the ejection orifice forming plate and a member for holding the ejection orifice forming plate have been coupled with each other from among members constituting the entire liquid jet recording head, and simultaneously emitting a plurality of parallel laser beams in a direction inclined at a predetermined angle with respect to a vertical axis of the mask plate face, thereby processing and forming a discharge nozzle at the ejection orifice forming plate, wherein the closely contacted mask plate and the ejection orifice forming plate are reciprocally scanned by one reciprocation or more along an arrangement for forming the discharge nozzles with respect to the emission area of the laser beams.

In a method for manufacturing a liquid jet recording head according to the present invention, it is preferable that emissions of a plurality of ultraviolet-ray laser beams with high energy are arranged so as to be incident in a direction obliquely inclined by a predetermined angle with respect to the vertical axis of the mask plate. In addition, it is preferable that emissions of a plurality of parallel ultraviolet-ray laser beams with high energy are arranged so as to be incident in a direction equally divided with respect to the peripheral direction of the vertical axis of the mask plate.

In a method for manufacturing a liquid jet recording head according to the present invention, it is preferable that parallel ultraviolet-ray laser beams with high energy each are composed of four luminous fluxes, and are emitted in a direction equally divided with respect to the peripheral direction of the vertical axis, the beams each being obliquely inclined by a predetermined angle with respect to the vertical angle of the mask plate.

According to the present invention, an integral effect is achieved by non-uniform emission of ultraviolet-ray laser beams, thereby making it possible to perform ultraviolet-ray laser beam emission for each discharge nozzle in the same manner and predetermined conditions. As a result, all of the discharge nozzles are processed in uniform shape, whereby the recording liquid droplets can be jetted constantly and accurately, enabling high quality printing.

Further, the discharge nozzle can be processed and formed in the final process after the liquid jet recording head has been assembled, thereby eliminating the anisotropy in the liquid ejection direction caused by deformation due to assembling and bonding of the ejection orifice forming plate. In addition, a convergent taper-shaped discharge nozzle can be formed at the liquid ejection side (outside) of the ejection orifice forming plate, whereby the liquid droplet ejection direction is stable in a constant direction, and the jetting speed of the recording liquid to be discharged is improved. Therefore, a high resolution image having extremely reduced mist and clear circular print dots is obtained, whereby a print quality of the liquid jet recording head is remarkably improved, and fast printing is enabled.

DETAILED DESCRIPTION OF THE PREFERRED EMBODIMENTS

Preferred embodiments of the present invention will be described with reference to the accompanying drawings.

Figures 1A, 1B:
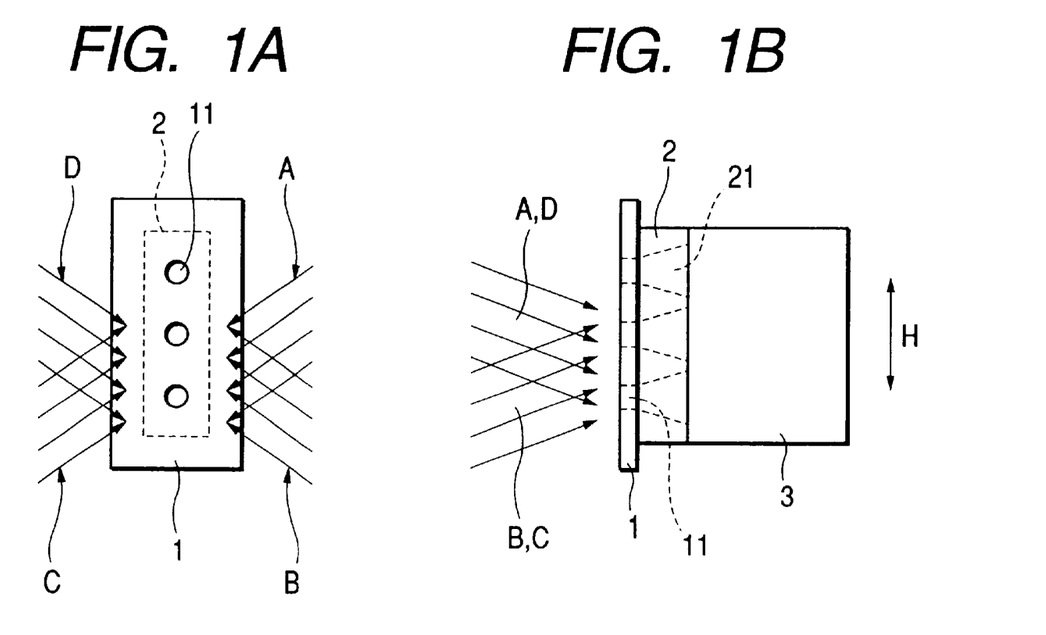
FIG. 1A is a schematic frontal view showing a method for processing a discharge nozzle of a liquid jet recording head according to the present invention.
FIG. 1B is a schematic side view thereof.
Figure 1C:
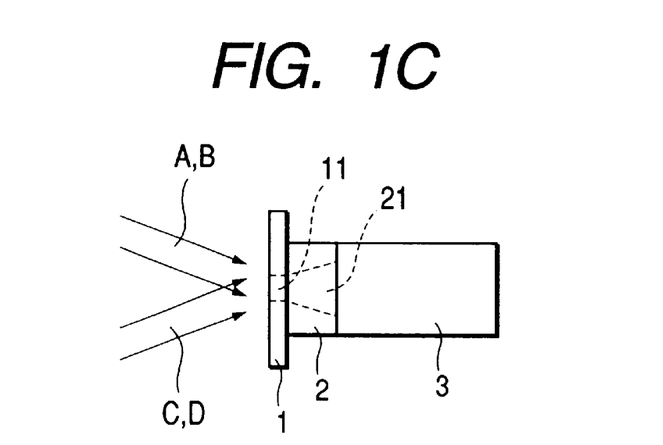
FIG. 1C is a schematic bottom face view thereof.

FIG. 1 is a schematic view showing the method for processing the discharge nozzle of the liquid jet recording head according to the present invention. Hereinafter, the discharge nozzle processing method according to the present invention will be described in detail.

In FIG. 1, reference numeral 1 denotes a mask plate on which an ejection orifice pattern 11 corresponding to the shape of an ejection orifice to be formed is formed; reference numeral 2 denotes an ejection orifice forming plate (hereinafter, referred to as an orifice plate) having a discharge nozzle 21 formed therein; and reference numeral 3 denotes a liquid jet recording head main body to be coupled with the orifice plate 2. The discharge nozzle 21 is formed by parallel ultraviolet-ray laser beams A, B, C, and D being emitted from the liquid ejection side to the orifice plate 2 of the liquid jet recording head while the orifice plate 2 is coupled with the liquid jet recording head main body 3, and is assembled. These laser beams A, B, C, and D are inclined in their different directions with respect to the perpendicular line of the mask plate 1 brought in close contact with the orifice plate 2 in advance, and the superposition of the laser beams A, B, C, and D is defined at a pattern portion of the mask plate 1.

Figure 2:
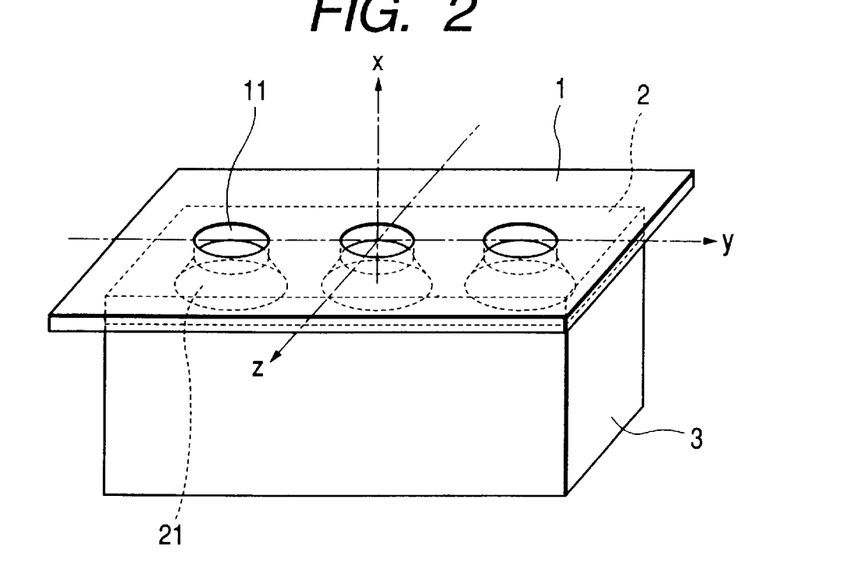
FIG. 2 is a perspective view showing a coordinate system of the liquid jet recording head according to the present invention.
Figure 3:
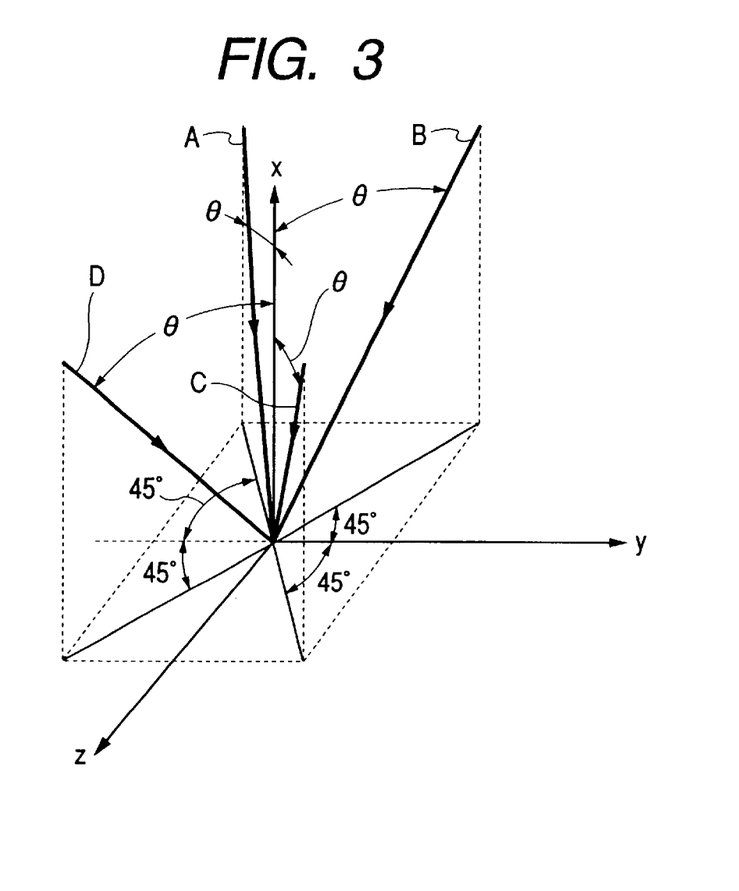
FIG. 3 is an illustrative view illustrating a laser emission direction in the method for processing the discharge nozzle of the liquid jet recording head according to the present invention.

Here, the direction of emitting each of the laser beams A, B, C, and D to the mask plate 1 will be described in detail. In the case where an xyz coordinate system as shown in FIG. 2 is set, the emitting directions are as shown in FIG. 3. That is, each laser beam is emitted in a direction in which a predetermined tilt angle θ is formed with respect to an x axis (a vertical direction of the mask plate 1) while an angle of 45 degrees (the angle of each laser beam is 90 degrees apart) is set as a reference with respect to a y axis (a direction in which the discharge nozzle 21 is arranged). The angle θ is set as a design angle depending on the thickness of the orifice plate 2 to be processed and the energy density of laser light. The angle is set in the range from 5 to 20 degrees, and is set to 15 degrees in the illustrative embodiment.

Figure 4A:
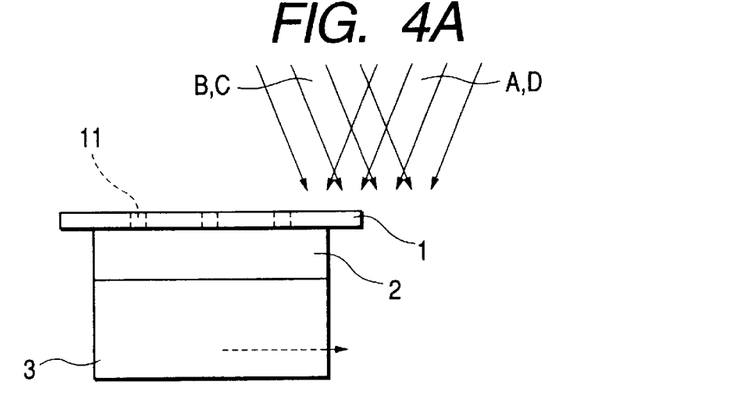
FIGS. 4A, 4B and 4C are illustrative views of the steps based on the method for processing the discharge nozzle of the liquid jet recording head according to the present invention.
Figure 4B:
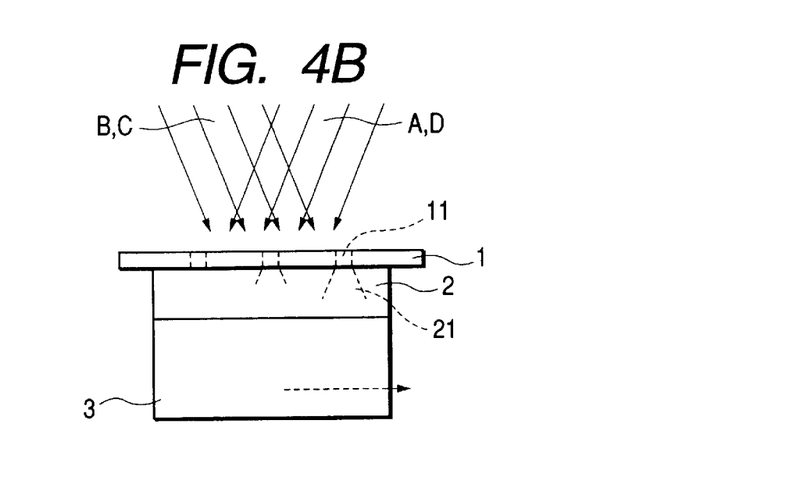
Figure 4C:
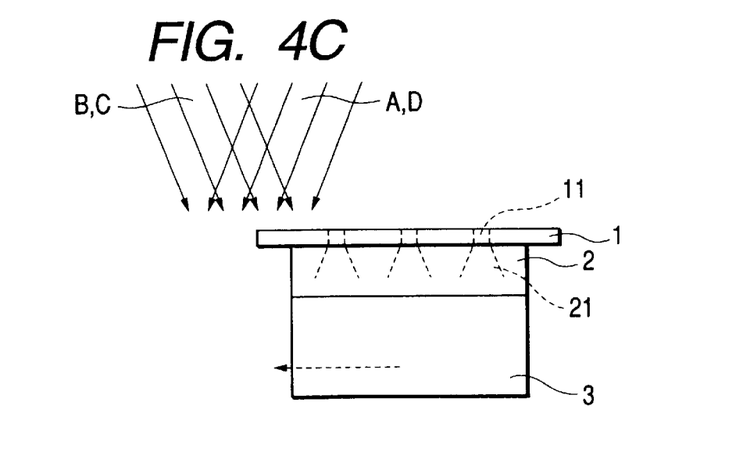
Figure 5A:
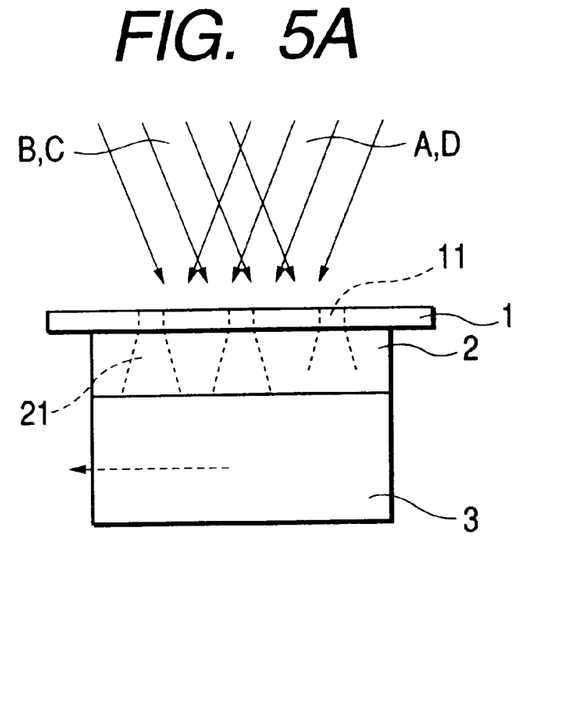
FIGS. 5A and 5B are illustrative views of the steps based on the method for processing the discharge nozzle of the liquid jet recording head according to the present invention, and illustrate the steps following the steps shown in FIGS. 4A to 4C.
Figure 5B:
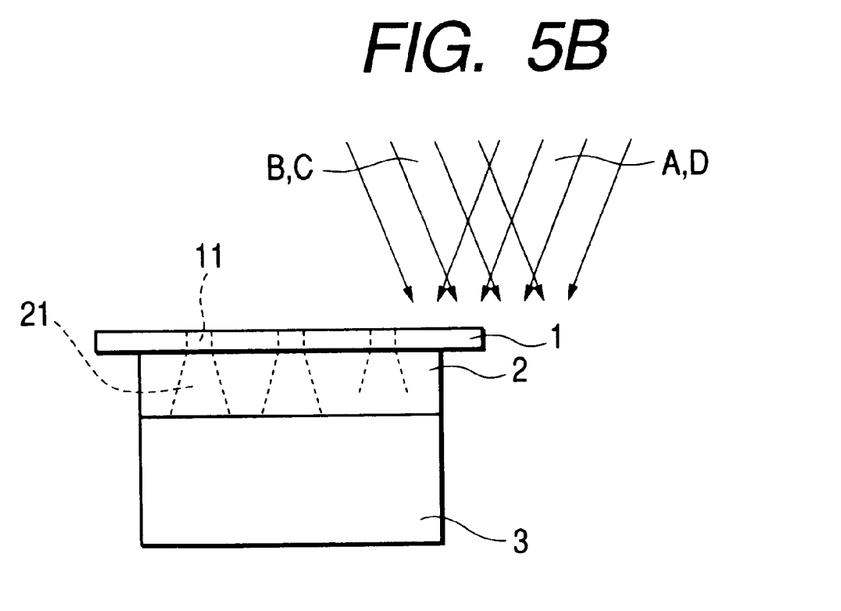

The orifice plate 2 coupled with the liquid jet recording head main body 3 is in close contact with the mask plate 1. Between the start and the end of processing, these plates are reciprocally moved by one reciprocation or more in an arrangement direction in which a discharge nozzle is formed (a direction H indicated by the arrow in FIG. 1B) with respect to an ultraviolet-ray laser beam emission area. An example of this processing will be described in detail with reference to FIGS. 4–4C and FIGS. 5A and 5B. First, the orifice plate having the mask plate 1 brought into close contact therewith and the liquid jet recording head main body 3 are conveyed from the outside of the laser emission area in the same direction as the discharge nozzle arrangement direction (from the left to the right in the figure) (FIG. 4A). Then, the plate and main body pass through the laser emission area, and an ejection orifice portion is processed and formed (FIG. 4B). When they are conveyed to the outside of the laser emission area (FIG. 4C), they are conveyed in an opposite direction thereto (from the right to the left in the figure). In this manner, they pass through the laser emission area again, and the ejection orifice portion is formed (FIG. 5A). When they are conveyed outside of the laser emission area, all the emission nozzles 21 are formed (FIG. 5B). This reciprocal movement makes it possible to equally emit lasers in predetermined conditions with respect to each discharge nozzle which is processed and formed with an integral effect for eliminating any non-uniformity of emission dimensions of ultraviolet-ray laser beams for processing the discharge nozzles. As a result, all of the discharge nozzles are processed in a uniform shape.

In this manner, parallel ultraviolet-ray laser beams A, B, C, and D are emitted simultaneously in four directions, and the orifice plate 2 having the mask plate 1 brought into close contact therewith and the liquid jet recording head main body 3 are reciprocally moved with respect to the laser emission area, whereby the plate and head are sublimated and processed in the forward direction of each laser beam in the thickness direction of the orifice plate 2. Then, a plurality of discharge nozzle, 21 having their convergent tapered and uniform shapes are formed in the liquid ejection direction (toward the mask plate side).

Figure 7:
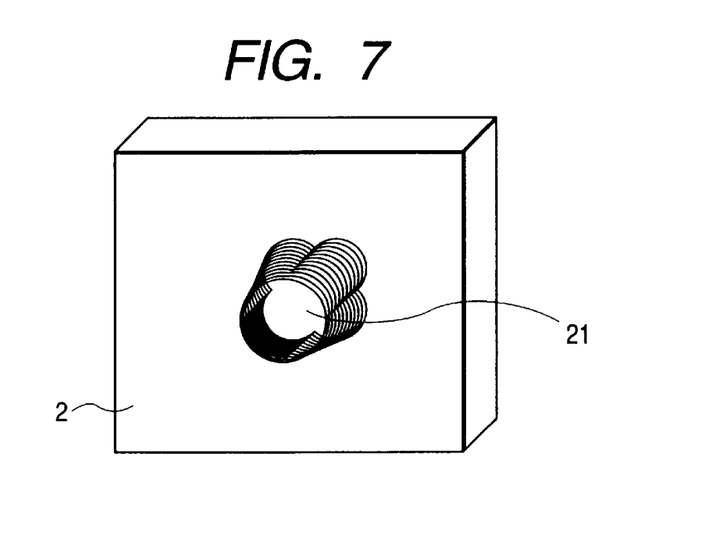
FIG. 7 is a perspective view of a discharge nozzle processed based on the method for processing the discharge nozzle of the liquid jet recording head according to the present invention.

The shape of each thus processed discharge nozzle 21 is not formed in the shape of a rotationally symmetrical cut cone, but rather in the shape as shown in FIG. 7. Because of emission and processing of four laser beams in an axially symmetrical direction relative to the x axis, a cone shape is formed at the recording liquid ejection side, a substantially rectangular shape in which four circles are superimposed in the radiation shape is formed at the recording liquid supply side, and a shape in which these circles are gradually changed to a substantial rectangle is formed in the thickness direction of the orifice plate 2.

Now, a liquid jet recording head to which the aforementioned discharge nozzle processing method is applied will be described with reference to FIGS. 6A to 6C.

Figure 6A:
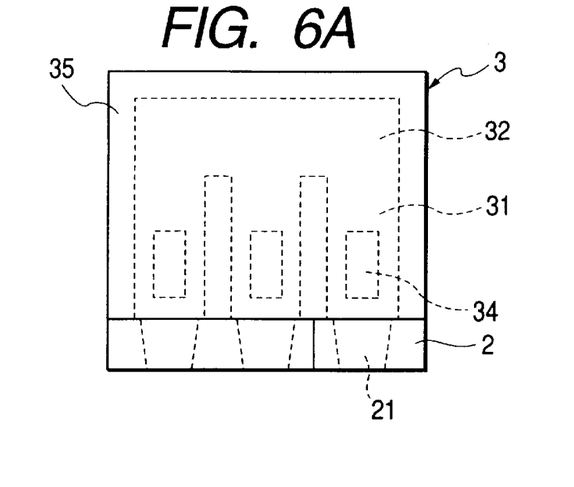
FIG. 6A is a schematic top view showing a liquid jet recording head manufactured by the processing method according to the present invention.
Figure 6B:
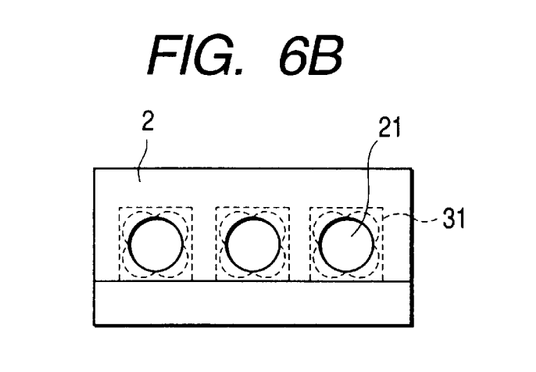
FIG. 6B is a schematic frontal view thereof.
Figure 6C:
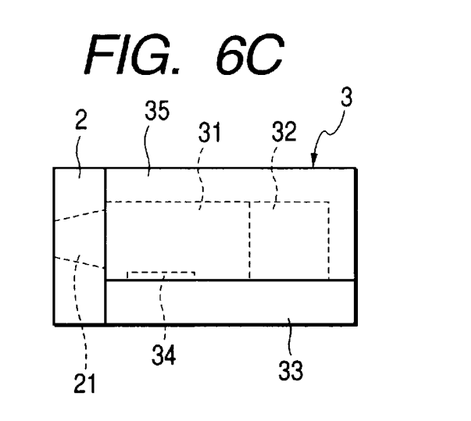
FIG. 6C is a schematic side view thereof.

In FIGS. 6A to 6C, reference numeral 33 denotes a substrate. A liquid ejection pressure generating element 34 such as an electrothermal converting element or an electromechanical converting element for discharging the recording liquid are provided on the substrate 33. This liquid ejection pressure generating element 34 is arranged in a liquid flow passage 31 communicating to the discharge nozzle 21, and the individual liquid flow passage 31 communicates with a common liquid chamber 32. A liquid supply tube (not shown) is connected to this common liquid chamber 32, and a recording liquid is supplied from the recording liquid tank via the liquid supply tube. In addition, reference numeral 35 denotes a top plate having a recess portion for forming the liquid flow passage 31 and the common liquid chamber 32. This top plate 35 is coupled with a substrate 33, thereby configuring a liquid jet recording head main body 3 forming the liquid flow passage 31 and the common liquid chamber 32. Further, an orifice plate 2 comprising a discharge nozzle 21 is provided at the end of the liquid flow passage of the liquid jet recording head main body 3. Furthermore, the disposition of discharge nozzle 21 formed at the orifice plate 2 can be set properly so that a plurality of nozzles are formed in a one-dimensional arrangement or a plurality of arrangements are formed in a plurality of columns.

Such liquid jet recording head can be fabricated as follows. A heater 34 that is a heat resistance element for generating thermal energy as energy utilized for discharging liquid and an integrated circuit such as shift register (not shown) or electric wiring are patterned on a silicon substrate, thereby fabricating the substrate 33. In addition, a recess portion that is a liquid flow passage 31 and a common liquid chamber 32, and a liquid supply orifice (not shown) are formed on a silicon plate through chemical etching, and a top plate 35 is fabricated. Thereafter, the substrate 33 and the top plate 35 are bonded to be aligned with each other so that a recess portion that is a liquid ejection side end face and a liquid flow passage 31 is coincident with the arrangement of the heater 34, and a liquid jet recording head main body 3 is formed. Then, an orifice plate 2 on which a discharge nozzle is not formed is bonded with the liquid ejection side end face of the liquid jet recording head main body 3. In this state, a discharge nozzle 21 is processed and formed by employing the aforementioned discharge nozzle processing method, and thereafter, an electric substrate having a heater driving terminal (not shown) patterned thereon is bonded, an aluminum base plate is bonded with the substrate 33, and then, a holder for holding each member and a recording liquid tank for supplying a recording liquid are bonded with each other, whereby a liquid jet recording head can be assembled.

In addition, the top plate 35 on which a recess portion being the liquid flow passage 31 and the common liquid chamber 32 and a liquid supply orifice are formed and an orifice plate 2 on which a discharge nozzle is not formed are integrated with each other by using resin ejection molding such as polysulfone, thereby forming a structure. The structure is aligned to be bonded with a substrate 33 on which an integrated circuit silicon chip having a heater 34 or the like patterned thereon is mounted. Then, a discharge nozzle 21 is formed by employing the aforementioned discharge nozzle processing method. Thereafter, an electric substrate having a heater driving terminal (not shown) patterned thereon is bonded, and an aluminum base plate is bonded with a substrate 33. Then, a holder for holding each member and a recording liquid tank for supplying a recording liquid are coupled with each other, whereby a liquid jet recording head can be assembled.

As has been described above, whatever liquid jet recording head may be constructed, discharge nozzle processing according to the present invention can be performed in the step following the step in which an orifice plate forming a discharge nozzle is bonded with a member for maintaining this plate. The liquid jet recording head is thus manufactured, thereby making it possible to prevent a discharge nozzle arrangement from being deformed due to distortion caused when the orifice plate is bonded with this holding member, or a position shift in the recording liquid ejection direction being generated due to the deformed orientation of the discharge nozzles in a non-uniform direction.

In addition, in the discharge nozzle 21 processed and formed as described above, the discharge nozzle at the liquid supply side of the orifice plate 2 is formed in a substantially rectangular shape, and the cut face in the liquid flow direction of the liquid flow passage 31 is formed in a rectangular shape. The discharge nozzles 21 are formed through laser processing so that their shapes are fitted with each other. Thus, there is achieved an advantageous effect that the discharge nozzle and liquid flow passage are shaped to be smoothly continuous, the flow resistance of the recording liquid is reduced, the recording liquid jetting speed is increased, a liquid jet recording head quality is improved, and the printing speed is improved.

In a specific embodiment according to the present invention, after an orifice plate consisting of a polysulfone of 50 microns in thickness has been bonded with the liquid jet recording head main body, a mask plate on which 150 ejection orifice patterns of openings of 20 microns in diameter are formed at a light reflection index of 98% or more in emission laser wavelength and at an arrangement density of 300 dpi is brought into close contact with this orifice plate, and four parallel beams are emitted to the mask plate at a laser power density of 1 J/cm$^2$. Then, the closely contacted mask plate 1 and orifice plate 2 and the liquid jet recording head main body 3 are subjected to two reciprocating scannings with respect to laser beam luminous fluxes emitted at the start and end of processing, whereby a discharge nozzle is processed and formed. At this time, the tilt angle of each parallel beam is set to 15 degrees with respect to the liquid ejection direction axis. Thus, while 50 liquid jet recording heads are fabricated, and the shape of the discharge nozzle is observed, a convergent tapered shape is formed at the liquid ejection side in all the discharge nozzles, and the dispersion in shape of each discharge nozzle is reduced more remarkably than a conventional nozzle.

In addition, when printing is actually performed with the thus fabricated liquid jet recording head, mist is extremely reduced. Therefore, the shape of print dots is formed in a clear circle, and a superior print quality image is obtained.

As has been described above, according to the present invention, ultraviolet-ray laser beams under the predetermined conditions are emitted to each discharge nozzle due to an integral effect for eliminating the emission non-uniformity of ultraviolet-ray beams. As a result, all of the discharge nozzles are processed in uniform shape, whereby the recording liquid droplets can be jetted constantly and accurately, enabling high quality printing.

In addition, a convergent tapered shape toward the liquid ejection side can be fabricated in the uniform shape of all the discharge nozzles through laser processing from the liquid ejection side of the ejection orifice forming plate, whereby the liquid droplet ejection direction is stabilized, improving the jetting speed of the recording liquid to be discharged. Therefore, a high resolution image having extremely reduced mist and clear circle print dots is obtained, the print quality of the liquid jet recording head is remarkably improved, and fast printing is enabled.

What is claimed is:

1. A method for processing a discharge nozzle of a liquid jet recording head, comprising the steps of:

bringing a mask plate, on which the shape of an ejection orifice to be formed is patterned, into close contact with a liquid ejection side of an ejection orifice forming plate on which a plurality of ejection orifices of a liquid jet recording head are to be formed; and emitting parallel laser beams from the mask plate side, thereby processing and forming a discharge nozzle in the ejection orifice forming plate, wherein the closely contacted mask plate and the ejection orifice forming plate are reciprocally scanned by one reciprocation or more along a direction parallel to an arrangement direction of the plurality of ejection orifices with respect to a laser beam emission area.

2. The method for processing a discharge nozzle of a liquid jet recording head as set forth in claim 1, wherein a plurality of parallel laser beam emissions are each incident simultaneously in a direction inclined at a predetermined angle with respect to a vertical axis of the mask plate.

3. The method for processing a discharge nozzle of a liquid jet recording head as set forth in claim 2, wherein a plurality of parallel laser beam emissions are each incident simultaneously from equally spaced directions relative to the vertical axis of the mask plate.

4. The method for processing a discharge nozzle of a liquid jet recording head as set forth in claim 1, wherein a plurality of parallel laser beam emissions are incident simultaneously from equally spaced directions relative to a vertical axis of the mask plate.

5. The method for processing a discharge nozzle of a liquid jet recording head as set forth in claim 1, wherein the parallel laser beams each are comprised of four luminous fluxes, and the beams are emitted simultaneously in equally spaced directions with respect to a vertical axis of the mask plate, the beams each being inclined at a predetermined angle with respect to the vertical axis of the mask plate.

6. A method for manufacturing a liquid jet recording head, comprising the steps of:

bringing a mask plate, on which the shape of an ejection orifice to be formed is patterned, into close contact with a liquid ejection side of an ejection orifice forming plate on which a plurality of ejection orifices are to be formed after at least the ejection orifice forming plate and a member for holding the ejection orifice forming plate have been coupled with each other from among members constituting the entire liquid jet recording head; and simultaneously emitting a plurality of parallel laser beams in a direction inclined at a predetermined angle with respect to a vertical axis of the mask plate, thereby processing and forming a discharge nozzle in the ejection orifice forming plate, wherein the closely contacted mask plate and the ejection orifice forming plate are reciprocally scanned by one reciprocation or more along a direction parallel to an arrangement direction of the plurality of ejection orifices with respect to an emission area of the laser beams.

7. The method for manufacturing a liquid jet recording head as set forth in claim 6, wherein a plurality of parallel laser beam emissions are incident from equally spaced directions with respect to the vertical axis of the mask plate.

8. The method for manufacturing a liquid jet recording head as set forth in claim 6, wherein a plurality of parallel laser beams each are comprised of four luminous fluxes, and said beams each are emitted in equally spaced directions with respect to the vertical axis of the mask plate, the beams each being inclined at a predetermined angle with respect to the vertical axis of the mask plate.

9. The method for manufacturing a liquid jet recording head as set forth in claim 6, wherein a heat generating element is provided for generating thermal energy for discharging liquid from the discharge nozzle.

10. The method for manufacturing a liquid jet recording head as set forth in claim 6, wherein a plurality of parallel laser beam emissions are each incident in a direction inclined by a predetermined angle with respect to the vertical axis of the mask plate.

11. The method for manufacturing a liquid jet recording head as set forth in claim 10, wherein a plurality of parallel laser beam emissions are incident from equally spaced directions with respect to the vertical axis of the mask plate.

* * * * *